United States Patent

Takahashi et al.

[11] Patent Number: 5,053,611
[45] Date of Patent: Oct. 1, 1991

[54] DEVICE FOR REDUCING MECHANICAL VIBRATIONS WHEN UTILIZING A MAGNETO-OPTICAL CARD AS A RECORDING MEDIUM

[75] Inventors: Akira Takahashi, Nara; Yoshiteru Murakami, Nishinomiya; Junichiro Nakayama, Nara; Kenji Ohta, Nara; Hiroyuki Katayama, Nara; Michinobu Mieda, Tenri, all of Japan

[73] Assignee: Sharp Kabushiki Kaisha, Osaka, Japan

[21] Appl. No.: 287,053

[22] Filed: Dec. 21, 1988

[30] Foreign Application Priority Data

Dec. 26, 1987 [JP] Japan ................. 62-332251

[51] Int. Cl.⁵ .......................... G06K 7/10; G06K 7/01
[52] U.S. Cl. ................... 235/454; 235/476; 235/486; 369/13
[58] Field of Search ............. 235/435, 449, 454, 475, 235/476, 479, 486, 483, 484, 493, 487, 494; 369/13, 32; 360/59, 114

[56] References Cited

U.S. PATENT DOCUMENTS

| | | |
|---|---|---|
| 3,624,623 | 11/1971 | Breton, Jr. |
| 3,736,385 | 5/1973 | Waring, Jr. |
| 4,534,031 | 8/1985 | Jewer ............... 369/97 |
| 4,680,456 | 7/1987 | Drexler ........... 235/454 |
| 4,730,293 | 3/1988 | Pierce et al. ..... 235/454 |
| 4,748,606 | 5/1988 | Naito et al. ..... 360/114 |
| 4,782,221 | 11/1988 | Brass et al. ..... 235/494 |
| 4,786,792 | 11/1988 | Pierce et al. .... 235/454 |
| 4,810,868 | 3/1989 | Drexler ........... 235/487 |
| 4,811,321 | 3/1989 | Enari et al. ...... 369/59 |
| 4,812,633 | 3/1989 | Vogelgesang et al. ..... 235/487 |
| 4,957,580 | 9/1990 | Drexler et al. ........... 235/488 |

FOREIGN PATENT DOCUMENTS

| | | |
|---|---|---|
| 58-14306 | 1/1983 | Japan. |
| 58-17505 | 2/1983 | Japan. |
| 60-150202 | 8/1985 | Japan ................. 369/13 |
| 62-273638 | 11/1987 | Japan. |

OTHER PUBLICATIONS

IBM Technical Disclosure Bulletin article "Beam Accessed Chip File" by Garwin; vol. 15, No. 2, Jul. 1972.

Primary Examiner—Stuart S. Levy
Assistant Examiner—Robert Weinhardt

[57] ABSTRACT

A recording and reproducing device for a magneto-optical card includes an optical head for irradiating a magneto-optical recording medium of a magneto-optical card placed into the device with a laser beam. A magnetic field generator applies a biased magnetic field to the magneto-optical recording medium, and an optical system manipulating mechanism for the optical system of the above-mentioned optical head varies the spot irradiated by the laser beam. The optical head is fixed to the main frame of the device. The magneto-optical card is also supported where it is irradiated by the laser beam emitted from the optical head. The magneto-optical card is moved in a plane parallel to the surface of the magneto-optical card for rough searching and then a part of or the whole magnetic field generator is moved to come into contact with the magneto-optical card to stop the vibration of the magneto-optical card. The spot to be irradiated by the laser beam is then varied by means of the optical system of the optical head.

16 Claims, 4 Drawing Sheets groove forward pit rearward pit adjacent pits

DEVICE FOR REDUCING MECHANICAL VIBRATIONS WHEN UTILIZING A MAGNETO-OPTICAL CARD AS A RECORDING MEDIUM

FIELD OF THE INVENTION

The present invention relates to a recording and reproducing device for a magneto-optical card, comprising a layer of re writable magneto-optical recording medium on a card, intended for recording information on the magneto-optical card and reproducing it therefrom.

BACKGROUND OF THE INVENTION

Magnetic cards with magnetic stripes formed as recording medium on name card size cards are now widely in use in banks as well as in the so-called "credit" field as personal ID (identifying) cards. Such magnetic cards, however, have rather limited uses due to their small storage capacity. This small capacity also limits their identifying capability, hence taking away from their usefulness and safety.

Recently, however, studies have been made about the possibility of IC cards and optical cards being used with lager storage capacity.

The optical card has an extremely large storage capacity, being capable of recording about of 1-200 M bytes, which is more than enough for a personal data memory. And the magneto-optical card, a kind of optical card, is capable of re-writing information unlike the optical card for reproduction or additional storage type, and is expected to be useful in wider and more diversified fields.

This magneto-optical card is composed of a card and a layer of magneto-optical recording medium formed thereon. The latter consists of a vertically magnetized film. With this magneto-optical card, recording of information is done by irradiation with laser beam having a biased magnetic field being applied from outside. As the magneto-optical recording medium irradiated with the laser beam is heated to a predetermined temperature, the magneto-optical recording medium is magnetized in the direction of the biased magnetic field as it is cooled thereafter. Hence, recording of given information becomes feasible when a given spot of the magneto-optical recording medium is inverted by magnetization with respect to the direction of initialization caused by laser beam irradiation and application of the biased magnetic field. Also, beam which has irradiated the magneto-optical recording medium.

A conventional recording and reproducing device for the aforesaid magneto-optical card is described below, with reference being made to FIGS. 8-11. Here, however, illustration of a magnetic field generator for application of a biased magnetic field is omitted.

In a recording and reproducing device shown in FIG. 8 first a magneto-optical card 21 is placed under an optical head 22 and is moved repetitively in the direction of the arrow Y at a high speed. The optical head 22 is properly moved in the direction perpendicular thereto (direction indicated by the arrow X). Then a laser beam 24 having passed an objective lens 23 of the optical head 22 moves super-fast along the Y-direction irradiating the magneto-optical recording medium of the magneto-optical card 21 and also moves properly along the X-direction for two-dimensional, scanning. Thus, by irradiation with the laser beam 24, a given piece of information can be recorded as well as reproduced at a given spot on the magneto-optical recording medium. A plurality of tracks are then formed along the Y-direction, and information is recorded along these tracks.

In another recording and reproducing device shown in FIGS. 9-11 the magneto-optical card 21 is placed under the optical head 22 and is properly moved along the direction indicated by the arrow Y. The optical head 22 is rotated at a high speed. This optical head 22 has four objective lenses 23 ... arranged at an equidistant inward of its periphery. The optical system is switched successively for the magneto-optical recording medium to be irradiated continuously or uninterruptedly with the laser beam 24 emitted through the objective lens 23 located above thereof at a given moment. Hence, the laser beam 24 is moving above the magneto-optical recording medium 23 in a circular path, while the magneto-optical card 21 moves properly in the Y-direction for two-dimensional scanning to be accomplished. On the magneto-optical recording medium there are formed a plurality of tracks in the form of parallel arcs, and information is recorded along these tracks. Needless to say, recording or reproducing of information by irradiation with the laser beam 24 is feasible on any spot on the magneto-optical recording medium.

In the above-described recording and reproducing device shown in FIG. 8, however, although the information recording and reproducing speed is determined by the moving speed of the magneto-optical card 21, the mechanism for moving the magneto-optical card 21 has a large mechanical loss, hence it is difficult to increase its speed. This conventional recording and reproducing device has a problem of the access time being too long.

With the recording and reproducing device shown in FIGS. 9-11, the information recording and reproducing speed is determined by the rotary speed of the optical head 22. With this disk-like optical head 22; the acceleration reaches an equilibrium as it rotates, and the small mechanical loss allows increase of the access speed. With this conventional recording and reproducing device, however, frequent switching of the optical system is needed so that the irradiation of the magneto-optical card 21 is done with the laser beam 24 emitted through the objective lens 23 located above the magneto-optical card 21; and thereby controlling the optical system becomes rather complicated.

Also, positioning of the laser beam 24 by moving either the magneto-optical card 21 or optical head 22 is inevitably low in precision, hence the object lens 23 provided in an optical system manipulating mechanism uses a method of varying the position of the objective lens 23 within a small range or of a light deflector for fine adjustment of the spot to be irradiated by the laser beam 24. This optical system manipulating mechanism enables moving the laser beam 24 on the magneto-optical recording medium in a range of several hundreds microns.

In recording information or data, it is a usual practice to divide the information into portions or units of a proper size. In the case of a magneto-optical recording medium such as a floppy disk, this unit is usually called a sector, whose size is 128 bytes–1,024 bytes. With small computers currently in use, it is often the case that the size of one sector is 512 bytes. Since 1 byte is 8 bits, 512 bytes equal 4,096 bits or 64×64 bits when expanded two-dimensionally. Hence, if 1 bit of data can be recorded in a 1.6×1.6 micron spot on a magneto-optical recording medium, the data equivalent of 1 sector (512 bytes) can be recorded in a 102.4×102.4 micron region. Actually, however, additional are needed for the sector No. and codes for correcting errors; but even if the volume of data per sector is increased 50% to 79×79 bits, a region of 126×126 microns is enough for recording a sector. If a recording media of magneto-optical characteristics consisting of vertically-magnetized film should be used, it is well possible to record 1 bit of data in a spot of 1.6×1.6 microns.

If the range within which the spot irradiated with the laser beam 24 can be varied by means of the optical system manipulating mechanism to 150 microns in order to access the region of 126×126 microns, the center position of the laser 24 in the optical head 22 can be a maximum of (150 microns - (126 microns / 2) = 87 microns)

87 microns off with respect to the predetermined data region on the magneto-optical card 21. This means that if the data region is roughly searched for with a precision of 80 microns by moving the magneto-optical card 21 and/or the optical head 22, one sector of data is accessible through variation of the irradiation spot of the laser beam 24 by means of the optical system manipulating mechanism only.

Thus, it is possible that, with a given division of data recorded in a two-dimensional region on the magneto-optical recording medium of the magneto-optical card 21, first the region is roughly searched for by moving the magneto-optical card 21 or the optical head 22 and then recording or reproduction of the data in the particular region by scanning with the laser beam 24 by means of the optical system manipulating mechanism. By this, high speed access becomes feasible and the normally complicated procedure for control of the optical system can be dispensed with.

However, when the optical head 22 being moved for rough searching is stopped, the resulting shock causes the objective lens 23 to vibrate and the accessing by means of the optical system manipulating mechanism is infeasible until stabilization thereof. It is possible to use an actuator-locking mechanism for forcibly fixing the optical head 22 as it is stopped, but this means further complication of the mechanical control mechanism.

When, as an alternative, the optical head 22 is kept fixed and the magneto-optical card 21 alone is moved, vibration of the magneto-optical card 21 has to be taken into consideration.

SUMMARY OF THE INVENTION

It is a primary object of the present invention to provide a recording and reproducing device for a magneto-optical card simple and capable of high-speed accessing by means of laser beam scanning through application of an optical manipulating mechanism used in convention optical heads.

Since there is a certain limit to the scope of laser beam scanning feasible by means of an optical system manipulating mechanism, it is necessary to do some degree of positioning through rough searching for a data region on the magneto-optical card. Although there is a limit to the manipulability of the optical system manipulating mechanism, the magneto-optical card is known to be quite high in recording density, hence it is possible to record a relatively large volume of information in a two-dimensional region when the optical system manipulating mechanism so constructed or modified to enable two-dimensional movement of the laser beam.

In doing rough searching for a data region on the magneto-optical card, moving the optical head is bound to result in vibration thereof due to sudden braking of the same when the positioning is over, this interferes with the starting of accessing without delay. Hence, according to the present invention, the optical head is fixed with respect to the optical head.

When the optical head is fixed, however, the magneto-optical card has to be moved for the rough searching, hence in the present invention, a magneto-optical card moving mechanism for supporting and moving the card is required.

Even when the magneto-optical card is moved for rough searching, vibration of the magneto-optical card due to its sudden braking when the positioning is over causes a problem. The recording and reproducing device for the magneto-optical card, however, has hitherto been installed nearby a magnetic field generator for applying a biased magnetic field to the magneto-optical recording medium. When this magnetic field generator is moved to where it comes into contact with the magneto-optical card upon completion of positioning, the latter's vibration can be stopped instantaneously. Hence, the present invention includes provision of a magnetic field generator moving mechanism for thus moving the magnetic field generator.

The magneto-optical card moving mechanism suffices if it can do positioning with a certain precision, vibration during movement, etc., being of no concern, hence it is possible to simplify its construction and yet increase its working speed. The magnetic field generator moving mechanism is solely intended to bring the magnetic field generator into contact with the magneto-optical card, hence this may be of simple construction, yet can be highly dependable.

Another object of the present invention is to make applicable a conventional, known optical system manipulating mechanism to laser beam scanning by additionally using a mechanism for displacing the objective lens or a photodeflector.

Still another object of the present invention is to dispose the optical head above the magneto-optical card and the magnetic field generator thereunder so that movement of the magnetic field generator moving mechanism does not interfere with irradiation with the laser beam.

A further object of the present invention is to make construction of the magnetic field generator moving mechanism simpler to construct by having the upper end face of the core generally used as a part of the magnetic generator and disposed closest to the magneto-optical card come into contact with the magneto-optical card through shifting of the magnetic field generator.

Still a further object of the present invention is to further simplify the construction of the magnetic field generator moving mechanism by making the core of the magnetic field generator alone come into contact with the magneto-optical card.

Another object of the present invention is to further simplify the construction of the magneto-optical card moving mechanism by enabling lengthwise and sidewise movement of the magneto-optical card for rough searching of a given spot to be made feasible.

Still another object of the present invention is to accomplish the above object of the present invention by providing a control mechanism for controlling the magnetic field generating mechanism and the optical system moving mechanism.

Still further object of the present invention is to further facilitate control by means of a mechanism for controlling the magnetic field generator moving mechanism and the optical system moving mechanism through formation of rows of pits and/or grooves to divide the surface of the magneto-optical recording medium of the magneto-optical card into defined regions.

A further object of the present invention is to cope with circular movement of the laser beam locus by the optical system moving mechanism by arranging the rows of pits and/or grooves for dividing the surface of the magneto-optical recording medium of the magneto-optical card in the form of parallel arcs.

Still a further object of the present invention is to further facilitate the control by means of a mechanism for controlling the magnetic field generator moving mechanism and optical system moving mechanism by arranging the pits in each row for dividing the surface of the magneto-optical recording medium of the magneto-optical card in a zigzag fashion.

DESCRIPTION OF THE EMBODIMENTS

Referring to FIGS. 1 through 7, explained below is a preferred embodiment of the present invention.

Figure 1:
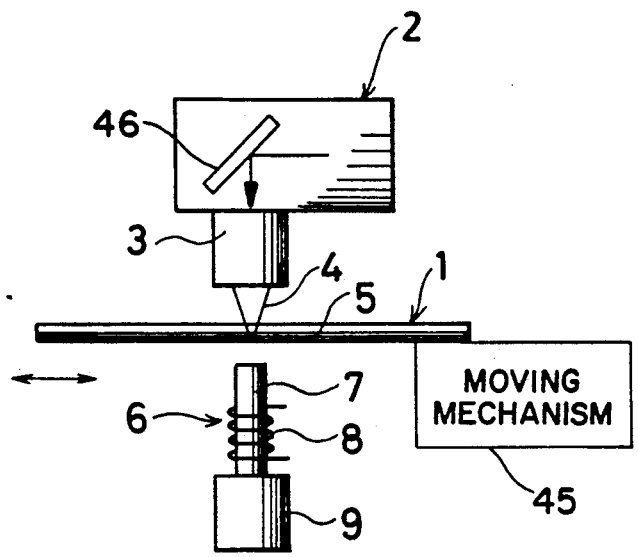
FIG. 1 is a front view of a recording and reproducing device for a magneto-optical card of the present invention.

As shown in FIG. 1, a recording and reproducing device for a magneto-optical card of this embodiment is so arranged that the magneto-optical card 1 is placed in under an optical head 2 to have it supported by a magneto-optical card moving mechanism 45. The magneto-optical card moving mechanism 45 is designed to be capable of moving the magneto-optical card 1 it supports horizontally, lengthwise as well as sidewise. A magneto-optical recording medium 5 on the magneto-optical card 1 is formed as a layer between a transparent sheet exposed on the card's surface and a protective sheet on the backside thereof. The magneto-optical card 1 is supported by the magneto-optical card moving mechanism 45 the side on which the transparent sheet is exposed facing upward.

The optical head 2 is fixed securely to the device's main frame. This optical head 2 has housed therein a semi-conductor laser emitter, and a laser beam 4 emitted thereby passes through an optical system and an objective lens 3 as a part thereof to irradiate a spot on the magneto-optical recording medium 5 of the magneto-optical card 1. This optical head 2 is provided with an optical system displacing mechanism (not shown), which is capable of displacing the objective lens 3 horizontally for fine adjustment of the spot to be irradiated. This optical head 2 has housed therein an optical system (having a conventional optical deflector 46) for receiving the laser beam 4 and a photo-detector so that as the pits and grooves portions change physically in the form on the magneto-optical recording medium 5 can be sensitively detected as well as magnetically recorded bits of data.

Under the magneto-optical card 1 (opposite the side of irradiation) by the laser beam 4 is disposed a magnetic field generator 6. This magnetic field generator 6 is composed of a core 7 and a coil 8 surrounding it. It is arranged so that a biased magnetic field can be applied to the magneto-optical recording medium 5 when the coil 8 is energized. This magnetic field generator 6 is arranged so that the upper end face of the core 7 is opposed to the backside of the magneto optical card 1 with a small gap therebetween. The magnetic field generator 6 is secured to a magnetic field generator moving mechanism 9 disposed thereunder. This magnetic field generator moving mechanism 9 serves to move the magnetic generator 6 vertically so that the upper end face of the core 7 can be pushed against the backside of the magneto-optical card 1.

The recording and reproducing device for the magneto-optical card, as described above, has the magneto-optical card 1 moved lengthwise and sidewise by the magneto-optical card moving mechanism for rough searching. This rough searching is done by properly moving the magneto-optical card 1 so that the any region of the magneto-optical recording medium may be irradiated by the laser beam 4 emitted by the fixed optical head 2. The positional precision of (tolerance for) the aforesaid rough searching is set to be not more than 80 microns.

Figure 2:
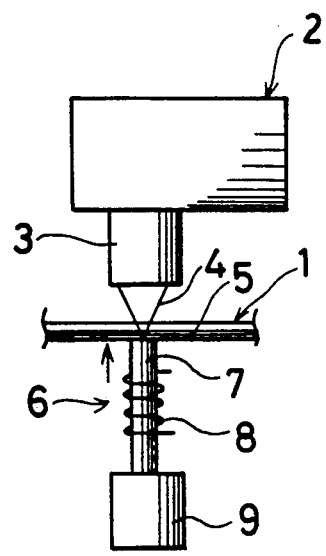
FIG. 2 is a side view the recording and reproducing device for the magneto-optical card shown in FIG. 1 with the magnetic field generator moved.

Upon completion of the rough searching, the magnetic field generator 6 is moved up immediately by the magnetic field generator moving mechanism 9, and as shown in FIG. 2, the upper end face of the core 7 is pressed against the backside of the magneto-optical card 1. The magneto-optical card 1 is then stopped as it is supported by the magneto-optical card moving mechanism and the vibration resulting from rough searching is thus forcibly stopped.

The optical head 2 then has its objective lens 3 displaced horizontally by the optical system manipulating mechanism systematically for the magneto-optical recording medium 5 to properly scan with the laser beam 4 for recording, reproducing and erasing of information. For erasing or recording formation the coil 8 is energized to produce the biased magnetic field from the magnetic field generator 6 which is applied to the magneto-optical recording medium 5.

Figure 3:
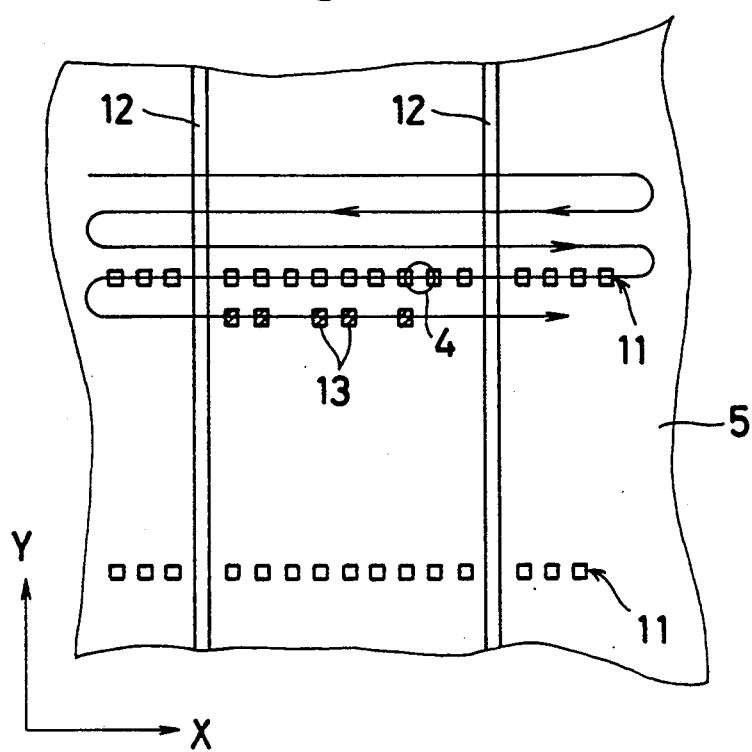
FIG. 3 is a view showing the formatting made on the magneto-optical recording medium of the magneto-optical card.

Now referring to FIG. 3, the way of formatting on the magneto-optical recording medium 5 of the magneto-optical card 1 is explained.

On the magneto-optical recording medium 5 a plurality of rows of pits 11 . . . , each thereof consisting of a large number of pits arranged in a X-direction being formed 126 microns apart. On the magneto-optical recording medium 5 a plurality of grooves 12 . . . in a Y-direction are also formed 126 microns apart. The individual pits of the row of pits 11 and the grooves 12 are both portions which change physically in their form. And the region defined by two rows of pits 11/11 and two grooves 12/12 is a sector, in which 4,096 bits (512 bytes) of data are magnetically stored.

On the magneto-optical recording medium 5 formatted, as described above two-dimensional scanning is undertaken by the laser beam 4 by means of the optical system manipulating mechanism. In this two-dimensional scanning the laser beam is first moved reciprocally and repeatedly along the X-direction at a given distance of not less than 143 microns. This 143 microns is the pitch of 126 microns between the adjacent grooves 12 and 12 divided by 2 ($\neq$63 microns) plus the tolerance of 80 microns for rough searching.

Figure 4:
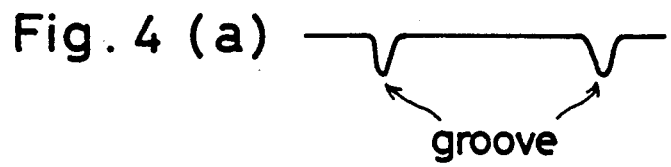
FIG. 4 (a) and FIG. 4 (b) are the time charts showing the reproducing device's output waveforms for the modes of formatting shown in FIG. 3, respectively.
Figure 4:

Then, this laser beam 4 is bound to cross the two grooves 12/12 defining the two sides of a given sector, and the output waveform of optical intensity detected by the optical head 2 reveals the signals showing the two grooves 2 as seen from FIG. 4 (a). This signal is formed by lowering of the optical intensity of the reflected light due to optical interference between the grooves 12 and the raised region adjacent thereto.

Also, this two-dimensional scanning is done with the laser beam 4 being slightly displaced in Y-direction each time it reciprocates in X-direction. This distance of displacement in Y-direction of the laser beam 4 equals the pitch between the adjacent data bits 13/13 in Y-direction. This pitch is 1.6 micron. The scanning width in Y-direction is to be set to be not less than 143 microns. This 143 microns is the pitch of 126 microns between the adjacent rows of pits 11/11 divided by 2 ($\neq$63 microns) plus the tolerance for rough searching 80 microns. The scanning range in Y-direction necessarily includes two rows of pits 11/11 defining the given sector on two sides; If the laser beam 4 is reciprocated in X-direction and is displaced successively in Y-direction, the output waveform of the optical intensity detected by the optical head 2 is a indicating the row of pits 11 twice as seen from FIG. 4 (b) in addition to the signal shown in FIG. 4 (a). This signal is formed by lowering of the optical intensity of the reflected light due to optical interference between the individual pits of the row of pits and the raised portions around them.

Hence, the given region in Y-direction is defined by the first appearance of the signal for the row of pits 11 shown in FIG. 4 (b) after start of the two-dimensional scanning until the second appearance of the same signal. And within these limits the distance between the grooves 12 and 12 in FIG. 4 (a) represents the region in X-direction.

When the laser beam 4 scans the predetermined region in X- and Y-direction to achieve proper access, recording, reproducing and erasing of data are feasible in the predetermined sector. For recording or erasing data, the laser beam 4 carrying the erasing signal or the data signal may be used for scanning with simultaneous application of the biased magnetic field. The data signal, however, has to be sent to the magnetic field generator 6 when recording is to be made by magnetic field modulation. The data stored in the individual data bits 13 can be reproduced if the magneto-optical effect of the laser beam 4 reflected in the given sector can be detected.

In the aforesaid mode, formatting approximately 210,000 sectors can be arranged in a region of 45$\times$75 mm on the magneto-optical recording medium 5 of the magneto-optical card 1, and approximately 100 M bytes of data are storable.

Figure 5:
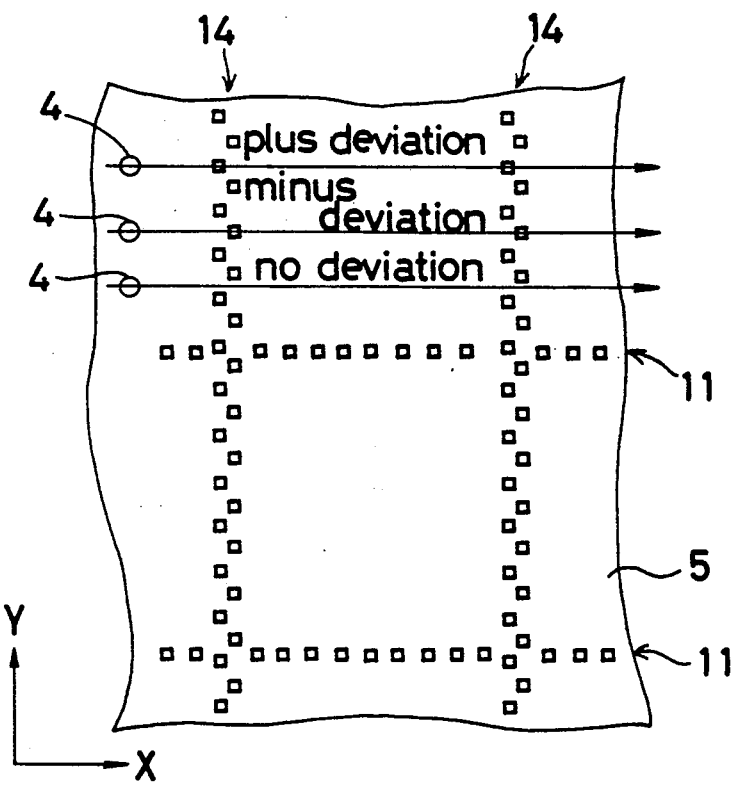
FIG. 5 is a view showing another mode of formatting made on the magneto-optical recording medium of the magneto-optical card.
Figure 6:
FIG. 6 (a) to FIG. 6 (c) are the time charts showing the reproducing device's output waveforms for the modes of formatting shown in FIG. 5, respectively.
Figure 6:
Figure 6:
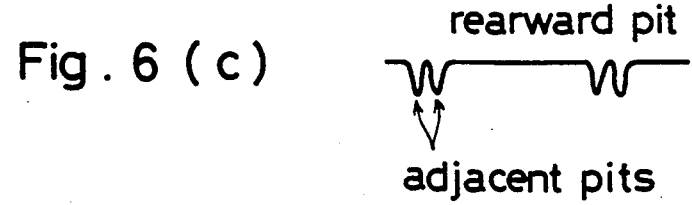

FIGS. 5 and 6 shows another mode of formatting on the magneto-optical recording medium 5.

If a gap is caused between the locus of scanning with the laser beam 4 in X-direction and the row of data bits 13 in the X-direction, with the laser beam 4 being displaced in Y-direction, detection errors are likely to occur. Hence in the formatting mode shown in FIG. 5, there are provided rows of pits 14 in Y-direction in which pits are arranged in a zigzag fashion instead of the grooves 12 in FIG. 3. When rows of pits 14 are arranged in the Y-direction, the output waveform of the light intensity detected by the optical head 2 is signals showing two pits in a zigzag fashion appearing adjacently in the rows of pits 14 in the Y-direction as shown in FIG. 6. If the scanning with the laser beam 4 in the X-direction should give rise to a plus deviation in the Y-direction, a more marked lowering in intensity is noted with the signal showing the forward one of the adjacent pits as shown in FIG. 6 (a). If, on the other hand, the scanning with the laser beam 4 in the X-direction should give rise to a minus deviation in the Y-direction, a more marked lowering in intensity is noted with the signal showing the rearward one of the adjacent pits as shown in FIG. 6 (b).

Hence, in this mode of formatting, the deviation of the laser beam 4 due to change in intensity of adjacent pits can be detected. It is, therefore, feasible to correct such deviation by varying the pitch in displacing the laser beam along the Y-direction. When the deviation in the laser beam 4 scanning is thus eliminated, the degrees of lowering in intensity of signals representing two adjacent pits become equal as shown in FIG. 6 (c).

Figure 7:
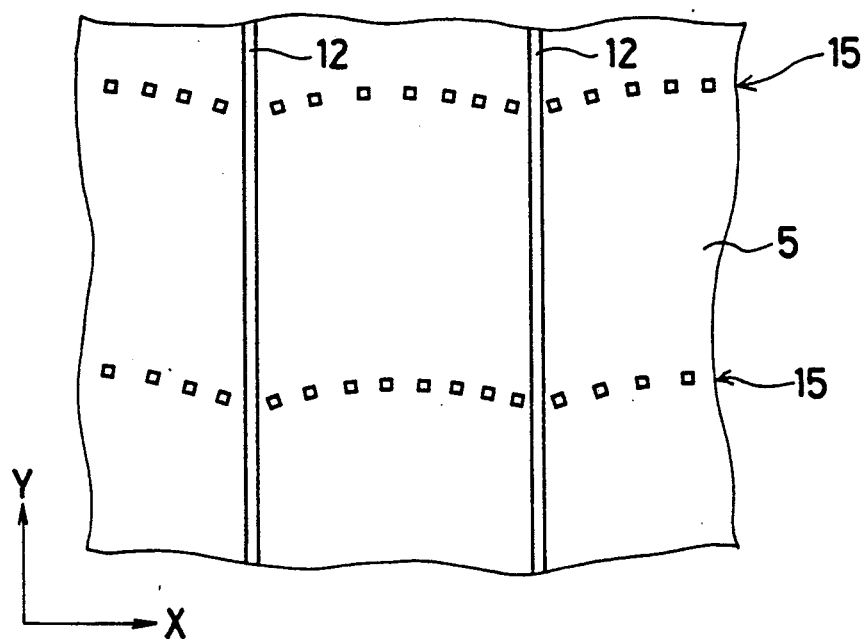
FIG. 7 is a view showing still another mode of formatting made on the magneto-optical recording medium on the magneto-optical card.
Figure 8:
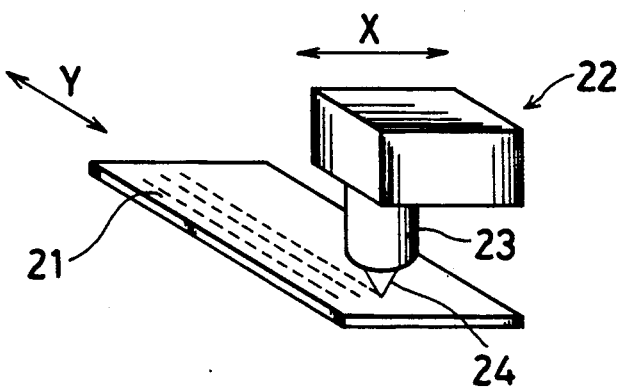
FIG. 8 is a schematic diagram showing of a conventional counterpart of the recording and reproducing device for the magneto-optical card.
Figure 9:
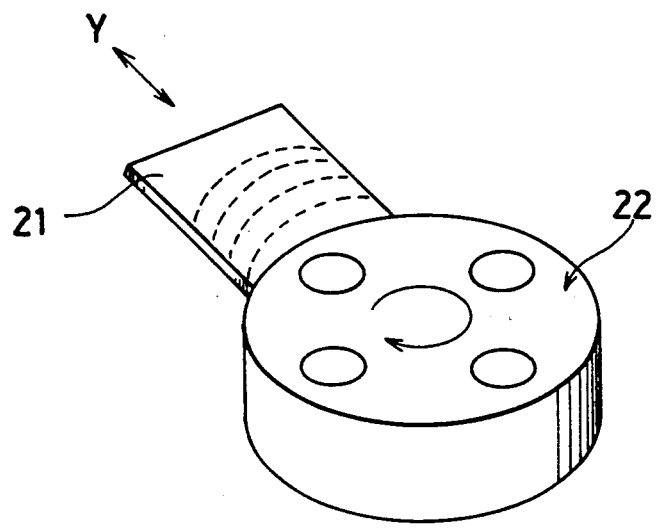
FIG. 9 is a schematic diagram showing of another conventional counterpart of the recording and reproducing device for the magneto-optical card.
Figure 10:
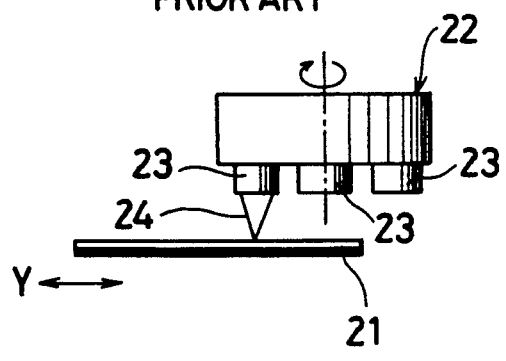
FIG. 10 is a side view of the recording and reproducing device for the magneto-optical card shown in FIG. 9.
Figure 11:
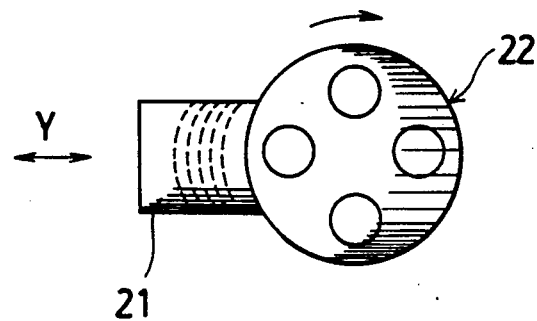
FIG. 11 is a view showing the recording and reproducing device for the magneto-optical card shown in FIG. 9.

FIG. 7 shows still another mode of formatting on the magneto-optical recording medium 5.

In some optical manipulation mechanism it is so arranged that displacement of the objective lens 3 is done by using a single fulcrum. It is, then, possible that scanning in the X-direction is done not linear but arc-like. Rows of pits 15 in the X-direction may be provided in arc form as shown in FIG. 7 instead of the rows of pits 11 in FIG. 3. In this case, scanning by the laser beam 4 in the X-direction is done in an arc-like form along the rows of pits 15. The data bits 13 (not shown), too, are arranged parallel to the arc-like row of pits 15 in X-direction.

Thus the recording and reproducing device for the magneto-optical card of the present invention comprises an optical head for irradiating a magneto-optical recording medium of a magneto-optical card placed in the device, a magnetic field generator applying a biased magnetic field to the magneto-optical recording medium and an optical system manipulating mechanism for the optical system to change the spot to be irradiated by the laser beam, a magneto-optical card moving mechanism for supporting the magneto-optical card where it is irradiated with the laser beam emitted from the optical head which is fixedly secured to the main frame of the device and also for moving the magneto-optical card horizontally in a plane parallel to the card's surface, and a magnetic field generator moving mechanism for moving a part or the whole of the magnetic field generator and bringing the part or the whole of magnetic field generator into contact with the magneto-optical card supported by the magneto-optical card moving mechanism.

Further, the recording and reproducing device for the magneto-optical card of the present invention is further characterized in that the optical system manipulating mechanism is so arranged that the laser beam irradiation spot can be varied by displacing an objective lens of the optical head.

Still further, the recording and reproducing device for the magneto-optical card of the present invention is further characterized in that the optical system manipulating mechanism is so arranged that the laser beam irradiation spot can be varied by means of an optical deflector in the optical head.

Furthermore, the recording and reproducing device for the magneto-optical card of the present invention is as characterized in that the optical head is disposed above the magneto-optical card supported by the magneto-optical card moving mechanism, and the magnetic field generator is disposed below this magneto-optical card.

Further still, the recording and reproducing device for the magneto-optical card of the present invention is characterized in that the magnetic field generator has a core and is arranged so that the upper end face of the core of the magnetic field generator can be brought into contact with the magneto-optical card by properly moving the magnetic field generator by with the magnetic field generator moving mechanism.

Furthermore, the recording and reproducing device for the magneto-optical card of the present invention is further characterized in that the core of the magnetic field generator alone can be moved by the magnetic field generator moving mechanism so that the upper end face of the core can be brought into contact with the magneto-optical card.

The recording and reproducing device for the magneto-optical card of the present invention is characterized in that the magneto-optical card moving mechanism is movable lengthwise as well as sidewise in a plane parallel to the surface of the card.

Still further, the recording and reproducing device for the magneto-optical card of the present invention is provided with a control mechanism which serves, after bringing the magnetic field generator into contact with the magneto-optical card by means of the magnetic field generator moving mechanism, to control the optical system manipulating mechanism so as to vary the spot to be irradiated with the laser beam emitted from the optical head for recording, reproducing or erasing information.

Furthermore, the recording and reproducing device for the magneto-optical card of the present invention is further characterized in that the surface of the magneto-optical recording medium of the magneto-optical card is divided, lengthwise and sidewise in rough proportions by rows of pits and/or grooves which portions change physically in form, into regions so that recording, reproducing and erasing of information is carried out regionwise.

Further still, the recording and reproducing device for the magneto-optical card of the present invention is characterized in that the rows of pits and/or grooves are arranged in arc form in each region defined thereby.

Furthermore, the recording and reproducing device for the magneto-optical card of the present invention is characterized in that the individual pits of each row of pits are arranged in a zigzag fashion.

The construction described above enables the magnetic field generator moving mechanism to bring a part of or the whole of the magnetic field generator into contact with the magneto-optical card to stop vibration instantaneously upon completion of rough searching. Hence, vibration resulting from sudden stopping of the magneto-optical card can be securely prevented and the laser beam scanning by means of the optical system manipulating mechanism can be started without delay.

Thus, when the optical head is fixed and rough searching is made by moving the magneto-optical card only, the present invention allows the start of laser beam scanning without waiting for the dampening of the vibration of the magneto-optical card, hence high-speed access to information is feasible.

Also, according to the present invention, it is possible to securely stop the magneto-optical card with the magnetic field generator at the time of recording, reproducing and erasing information to or from the magneto-optical card, hence the variation of the relative distance between the optical head and the magneto-optical card is reduced. Therefore, the necessity of focus adjustment is reduced. The focus servo control by the optical system manipulating mechanism is facilitated and the control system can be simplified.

Furthermore, according to the present invention, the magnetic field generator is brought into direct contact with the magneto-optical card at the time of recording and erasing information, thus the temperature of the magnetic field generator can be directly transmitted to the magneto-optical recording medium. Hence, by proper control of the temperature of the magnetic field generator, it is possible to have the temperature of the magneto-optical recording medium kept constant regardless of the ambient conditions. By having this temperature somewhat raised in advance, recording and erasing of information are feasible even if the laser beam intensity is somewhat low.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for recording on and reproducing from a magneto-optical card, comprising:
   an optical head for irradiating a magneto-optical recording medium of the magneto-optical card;
   a magnetic field generator for applying a biased magnetic field to said magneto-optical recording medium;
   optical system means for varying a spot to be irradiated by a laser beam;
   magneto-optical card moving means for supporting the magneto-optical card and for moving the magneto-optical card in a plane parallel to a surface of the magneto-optical card; and magnetic field generator moving means for moving a portion of said magnetic field generator into contact with the magneto-optical card when said optical head irradiates said laser beam upon the magneto-optical card;

said magnetic field generator preventing vibrations caused from the movement of the magneto-optical card by said magneto-optical card moving means when said optical head irradiates said laser beam upon the magneto-optical card.

2. The device as claimed in claim 1, wherein said optical system means is arranged so that said spot to be irradiated by said laser beam can be varied by displacing an objective lens of said optical head means.

3. The device as claimed in claim 1, wherein said optical system means is arranged so that said spot to be irradiated by said laser beam can be varied by an optical deflector in said optical head.

4. The device as claimed in claim 1, wherein said optical head is disposed on a side of the magneto-optical card opposite said magneto-optical card moving means and said magnetic field generator.

5. The device as claimed in claim 1, wherein said magnetic field generator has a core;

said core of said magnetic field generator being brought into contact with the magneto-optical card when moving said magnetic field generator by said magnetic field generator moving means to prevent vibrations.

6. The device as claimed in claim 5, wherein said core of said magnetic field generator only can be moved by said magnetic field generator moving means for said core to come into contact with the magneto-optical card.

7. The device as claimed in claim 1, wherein said magneto-optical card moving means is arranged so that the magneto-optical card can be moved lengthwise as well as sideways in a plane parallel to a surface of the magneto-optical card.

8. The device as claimed in claim 1, further comprising:

control means for controlling recording, reproducing and erasing of information by said laser beam after said magnetic field generator comes into contact with the magneto-optical card.

9. A system for recording and reproducing information, comprising:

a recording and reproducing device; and
a magneto-optical recording medium;
said recording and reproducing device including,
an optical head for irradiating said magneto-optical recording medium of a magneto-optical card,
a magnetic field generator for applying a biased magnetic field to said magneto-optical recording medium,
optical system means for varying a spot to be irradiated by a laser beam,
magneto-optical card moving means for supporting said magneto-optical card and for moving said magneto-optical card in a plane parallel to a surface of said magneto-optical card,
magnetic field generator moving means for moving a portion of said magnetic field generator into contact with said magneto-optical card when said optical head irradiates said laser beam to generate a spot on said magneto-optical recording medium, and
control means for controlling recording, reproducing and erasing of information by said laser beam after said magnetic field generator comes into contact with said magneto-optical card;

said magneto-optical recording medium of said magneto-optical card having a surface which is divided lengthwise and sidewise into regions according to rows of pits or grooves, said surface being arranged so that recording, reproducing, and erasing of information is done regionwise under control of said control means;

said magnetic field generator preventing vibrations caused from the movement of said magneto-optical card by said magneto-optical card moving means when said optical head irradiates said laser beam upon said magneto-optical card.

10. The recording and reproducing system as claimed in claim 9, wherein said rows of pits or grooves are arranged arc-like in each defined region.

11. The recording and reproducing system as claimed in claim 9, wherein individual pits of said rows of pits are arranged in a zigzag format.

12. A device for recording and reproducing information utilizing a magneto-optical card as a recording medium, comprising:

optical head for irradiating a laser beam onto the magneto-optical card;
magneto-optical card positioning means for positioning the magneto-optical card under said optical head; and
magnetic field generator for generating a magnetic field to be used during a recording or erasing process;

said magnetic field generator coming into physical contact with the magneto-optical card, after said magneto-optical card positioning means has moved the magneto-optical card and while said optical head is irradiating said laser beam onto the magneto-optical card to prevent vibrations caused from the movement.

13. The device as claimed in claim 12, wherein said optical head is disposed on a side of the magneto-optical card opposite said magneto-optical card moving means and said magnetic field generator.

14. The device as claimed in claim 12, wherein said magnetic field generator has a core;

said core of said magnetic field generator being brought into contact with the magneto-optical card when moving said magnetic field generator by said magnetic field generator positioning means to prevent vibrations.

15. The device as claimed in claim 14, wherein said core of said magnetic field generator only can be moved by said magnetic field generator positioning means for said core to come into contact with the magneto-optical card.

16. A method for preventing a magneto-optical card from vibrating during a search movement in a reproducing and recording device comprising the steps:

(a) moving the magneto-optical card to enable a finding of a desired position under a laser;
(b) moving a magnetic field generator into physical contact with the magneto-optical card after execution of said step (a) to prevent the magneto-optical card from vibrating;

(c) irradiating a laser upon the magneto-optical card to determine if a present position is the desired position after the execution of said step (b);

(d) irradiating the desired position under the laser with a laser beam to reproduce or record information when said step (c) determines that the present position in the desired position; and (e) generating a biased magnetic field with the magnetic field generator when recording information in said step (d).

* * * * *